United States Patent [19]

Wydevan

[11] Patent Number: 4,589,983
[45] Date of Patent: May 20, 1986

[54] FLUID FILTERING DEVICE

[75] Inventor: Robert M. Wydevan, Eagan, Minn.

[73] Assignee: Donaldson Company, Inc., Minneapolis, Minn.

[21] Appl. No.: 542,362

[22] Filed: Oct. 17, 1983

Related U.S. Application Data

[63] Continuation-in-part of Ser. No. 317,275, Nov. 2, 1981, Pat. No. 4,410,427.

[51] Int. Cl.$^4$ .............................................. B01D 27/06
[52] U.S. Cl. ........................................ 210/317; 55/489; 55/498; 55/521; 210/487; 210/489; 210/492; 210/493.3
[58] Field of Search ............... 210/314, 315, 317, 446, 210/450, 451, 484, 486–488, 492, 493.1, 493.3, 493.4, 493.5, 494.1, 497.01, 489; 55/489, 521, 497–499

[56] References Cited

U.S. PATENT DOCUMENTS

| | | | |
|---|---|---|---|
| 1,729,135 | 9/1929 | Slauson | 55/159 X |
| 2,190,886 | 2/1940 | Schaaf et al. | 55/498 X |
| 2,210,397 | 8/1940 | Dreiss | 210/487 X |
| 2,322,548 | 6/1943 | Sigmund | 210/487 X |
| 2,397,759 | 4/1946 | Sigmund | 55/498 X |
| 2,599,604 | 6/1952 | Bauer et al. | 210/487 X |
| 2,717,659 | 9/1955 | Schuldt | 55/489 X |
| 2,726,184 | 12/1955 | Cox et al. | 210/489 X |
| 3,020,977 | 2/1962 | Huppke et al. | 210/494.1 X |
| 3,025,963 | 3/1962 | Bauer | 210/493.4 |
| 3,037,637 | 6/1962 | Bub | 210/487 |
| 3,070,937 | 1/1963 | Bub | 55/387 |
| 3,112,184 | 11/1963 | Hollenbach | 210/493.4 X |
| 3,112,262 | 11/1963 | Parkinson | 210/494.1 X |
| 3,346,121 | 10/1967 | Bally | 210/493.3 |
| 3,372,533 | 3/1968 | Rummel | 210/493.1 X |
| 3,401,803 | 9/1968 | Bub | 210/488 |
| 3,759,391 | 9/1973 | Dreher | 210/494.1 |
| 3,771,661 | 11/1973 | Barnebey | 210/489 |
| 3,800,515 | 4/1974 | Asker et al. | 55/498 X |
| 3,807,150 | 4/1974 | Maracle | 55/498 |
| 3,858,793 | 1/1975 | Dudrey | 233/2 |
| 3,927,165 | 12/1975 | Grochol et al. | 55/521 X |
| 3,962,097 | 6/1976 | Reiman et al. | 210/487 X |
| 4,039,457 | 8/1977 | Schacht et al. | 210/493.4 |
| 4,065,341 | 12/1977 | Cub | 210/487 X |
| 4,199,387 | 4/1980 | Hladik | 55/497 X |
| 4,310,419 | 1/1982 | Nara et al. | 210/493.4 |
| 4,441,899 | 4/1984 | Takagi et al. | 55/521 X |
| 4,460,388 | 7/1984 | Fukami et al. | 55/521 X |

FOREIGN PATENT DOCUMENTS

| | | | |
|---|---|---|---|
| 25584 | 3/1981 | European Pat. Off. | 55/521 |
| 671096 | 2/1939 | Fed. Rep. of Germany | 210/492 |
| 2951216 | 7/1981 | Fed. Rep. of Germany | |
| 1106115 | 12/1955 | France | 210/487 |
| 1193833 | 11/1959 | France | 55/489 |
| 2148726 | 3/1973 | France | 55/521 |
| 717304 | 10/1954 | United Kingdom | 210/492 |
| 764846 | 1/1957 | United Kingdom | 210/487 |
| 868058 | 5/1961 | United Kingdom | 55/521 |
| 884027 | 10/1961 | United Kingdom | |
| 394065 | 1/1974 | U.S.S.R. | 55/521 |

OTHER PUBLICATIONS

Crossflow catalytic afterburner drawing.

*Primary Examiner*—Robert Spitzer
*Attorney, Agent, or Firm*—Merchant, Gould, Smith, Edell, Welter & Schmidt

[57] ABSTRACT

A fluid filtering device in various embodiments is disclosed. The filter includes, in one embodiment, alternating layers (34', 36') of corrugated filter media which are rolled together and sealed at alternate ends by sealant (38, 42) forming longitudinal flutes and transverse interflute passageways. Further embodiments disclose filter packs (112, 212, 312) of alternating layers of oppositely oriented corrugated filter media. In one embodiment, flutes of successive layers are aligned in parallel. In an alternate embodiment flutes are aligned orthogonally. Unfiltered fluids enter tubular passages (44) for example, and must exit by adjacent passages either above, below or beside the flute of entry to exit the filter. Filtering occurs when the fluid crosses a sidewall of filter media.

26 Claims, 19 Drawing Figures

FLUID FILTERING DEVICE

Continuation-in-part of U.S. application Ser. No. 317,275 entitled "Fluid Filtering Device, filed Nov. 2, 1981, now U.S. Pat. No. 4,410,427.

TECHNICAL FIELD

The present invention relates to fluid filtering devices, more particularly devices using generally corrugated filter media.

BACKGROUND OF THE INVENTION

In creating a fluid filter, an attempt is made to maximize the loading capacity while simultaneously minimizing the volume of the filter itself and its face velocity. Simultaneously, it is desirable to simplify or eliminate the housing structure necessary to support the filter. All of these factors must be considered with an eye to keeping the overall cost to a minimum.

Pleated paper filters with rigid housings have long been the industry standard for most filtering application. These filters, however, require relatively expensive housing structures and have relatively low filter densities and loading capacities.

Attempts have been made to increase the filter density and loading capacity of filter elements. One such filter is described in U.S. Pat. No. 2,322,548 issued to Sigmund wherein an impervious board matrix separates a flat filtering sheet which is rolled into a cylindrical shape. Filtering occurs when the fluid entering the intake side must cross through the inner walls at a right angle to exit by the outlet side. U.S. Pat. No. 2,210,397 issued to Dreiss uses a similar to orthogonal flow filtering scheme by carefully aligning two sheets of substantially flat filter paper with a specially designed top and bottom plates to direct airflow. U.S. Pat. No. 3,020,977 issued to Huppke et al introduces the additional feature of corrugated material between flat sheets, although the corrugated material performs no filtering function, merely acts as a spacer. Likewise, U.S. Pat. No. 2,397,759 issued to Sigmund employs a corrugated member as a spacer. None of these devices is able to achieve the high filtering density desired because of the use of materials which are merely structure rather than both structural and performing a filtering function.

The present invention recognizes the value of orthogonal filtering flow while insuring that every element of the filter performs both a structural and a filtering function, rather than merely one or the other. Thus, the desired result of maximizing strength and filter density while reducing face velocity and cost are achieved by the present invention.

BRIEF SUMMARY OF THE INVENTION

The present invention is, in one embodiment, directed to a fluid filter for removing affluent or particulate matter including two coaxial rolls of corrugated filter media the corrugations of one of said rolls being parallel to the axis of said rolls and the corrugations of the other of said rolls being transverse to the axis of said rolls, the nesting of said rolls together to form a composite roll so that oppositely oriented layers are in contact, thereby forming a plurality of longitudinal axis-parallel flutes extending through the roll from one end to the other and a series of axis-transverse inter-flute passageways, the longitudinal flutes being formed in two spiral series one on either side of the axis-parallel corrugated media, sealant means applied to one of the spiral series of flutes at one end of the composite roll and applied to the other series of flutes at the other end of composite roll so that fluid entering the remaining open flutes on one end of the roll must exit via the other series of open flutes on the other end and thereby being filtered and so that fluid entering the remaining flutes may flow transversely between said longitudinal flutes whereby the effective filter area is increased.

According to a further aspect of the invention, a fluid filter is disclosed including a top, bottom, two sides and a front and back, said top, bottom and two sides being fluid impervious, a fluid filter element disposed within said sides, the element including a first composite layer of filter media comprising orthogonally oriented corrugated medium forming longitudinal flutes and transverse interflute passageways, one surface of said media in contact with the top and the longitudinal flutes being orthogonal to the two sides of the filter, a second composite layer of filter media with one surface in contact with the bottom, the longitudinal flutes of the second layer being aligned in parallel with the longitudinal flutes of the first layer and intermediate element of filter media disposed between and in contact with the remaining sides of the first and second layers, the first, second and intermediate layers forming together a plurality of flutes having ends opened at the front and back, sealant means for preventing the entry and exit of fluids therethrough applied to every other of the openings of said first and second layers on the front side and applied to the openings on the back side of the remaining openings which are opened to the front side, so that the fluids entering the unsealed openings in one side of the filter must exit the filter on the other side of a different flute and whereby fluid may flow transversely between horizontally adjacent flutes.

According to a further aspect of the invention, there is disclosed a fluid filter having four sides, and top and bottom comprising a pair of fluid impervious planar members in a spaced relationship, a filter element bounded on its upper and lower sides by the planar members, the element including a filter pack having a first corrugated filter media having longitudinal peaks and valleys thereacross, a second layer atop the first layer, the second layer also being of corrugated filter media having transverse peaks and valleys thereacross, a third layer atop the second layer, the third layer being of corrugated media having longitudinal peaks and valleys which are oriented orthogonal to the corrugations of the first layer, sealant means applied to the first and second layers on peripheral edges thereof which are parallel to the axis defined by the longitudinal corrugations of the third layer for preventing entry and exit of fluid therethrough, said sealant means also being applied to the second and third layers on the peripheral edges which are parallel to the axis defined by the longitudinal corrugations of the first layer.

According to another aspect of the invention, the filter in the above paragraph may include additional sealant means for blocking passage of fluids therethrough applied to the two adjacent sides of the filter so that only the two remaining unsealed sides will allow passage of fluids into and out of the filter.

BRIEF DESCRIPTION OF THE DRAWINGS

The specific embodiments of the invention have been chosen for the purpose of illustration and description and are shown in the accompanying drawings which form a part of the specification wherein.

DETAILED DESCRIPTION OF THE INVENTION

The preferred embodiments of the present invention are directed to a commercially feasible, high density fluid filter which maintains high structural integrity without the need for additional housing elements. The filter embodiments described herein are useful for removing particulate matter or other non-particulate affluents such as ozone from fluids, i.e. gasses or liquids.

Figure 1:
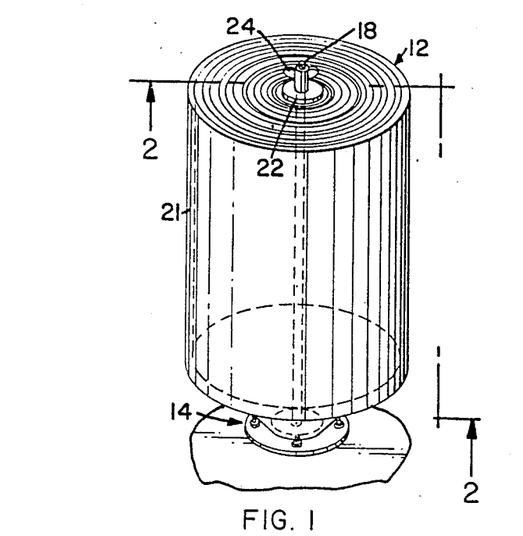
FIG. 1 is a perspective view of a cylindrical filter embodiment of the present invention.
Figure 2:
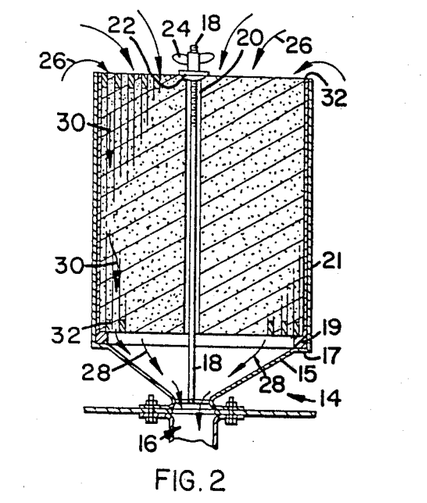
FIG. 2 is a cross sectional view taken along lines 2—2 of FIG. 1.

Reference should be had to FIGS. 1–4 where there is shown a first embodiment of the present invention. In FIGS. 1 and 2, a cylindrical filtering element 12 is shown in a typical installation wherein the bottom of filter 12 rests upon support 14 which is attached to the fluid intake 16 of the device needing filtered fluid. A bolt 18 runs the length of element 12 through a center hole 20 therein and by means of a washer 22 and a wing nut 24 the filter is affixed to the base 14. Alternatively, center hole 20 may be sealed and the filter may be affixed to the base by clamps.

Washer 22 should be of a sealing type preferably made of a rubber or plastic material in order to prevent any incoming fluid from bypassing filter through hole 20 which runs the length of the filter element. Base 14 includes a cup shaped reduction portion 15 and a flat section 17 to engage to bottom edge of the filter which preferably includes a seal 19 for fluid tight engagement of the filter and base. Extending vertically from flat section 17 is a cylindrical portion 21 which may preferably be used as a guide for proper insertion of the filter and to protect it from rocks and other debris.

It is noted that fluid intake in this device is shown by arrows 26 occurs at the top end thereof and that filter fluids exit by the bottom end as shown by arrows 28. Filtering occurs within the body of filter as shown by arrows 30, details of which will be explained when reference is made to FIG. 6 of a further embodiment.

The filter element 12 preferably includes an impervious barrier element 32 (shown in FIG. 2) which is cylindrical in shape so as to be sized to receive the body of element 12 therewithin. The purpose of barrier 32 is primarily to prevent entry of uncleaned fluid via the sidewalls of the element, thereby directing it in the flow shown by arrows 26. The barrier is not needed for structural integrity and therefore may be made of a coating of sealant material such as urethane or silicon rubber or hot melt caulk rather than a discrete fiber or metal.

Figures 3, 4:
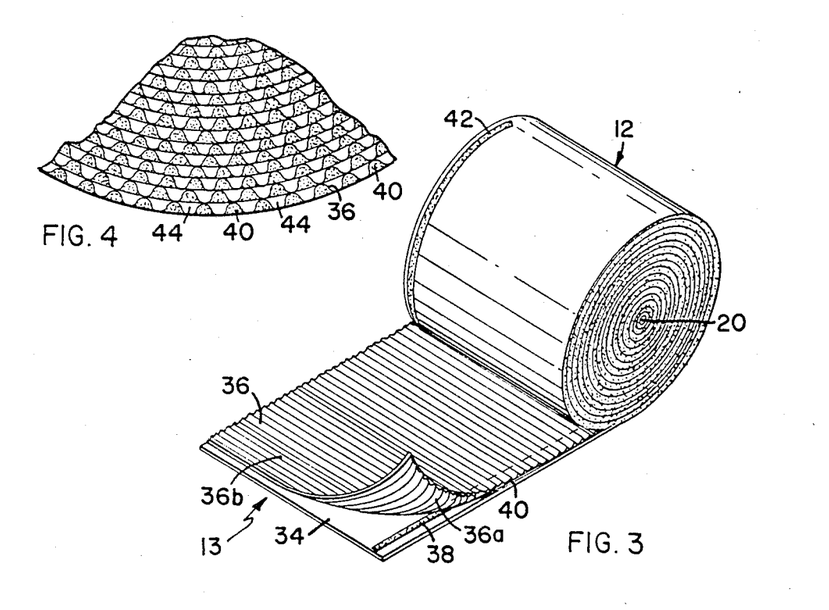
FIG. 3 is a perspective of the embodiment in FIG. 1 partially unassembled.
FIG. 4 is an enlarged fragmentary portion of the embodiment in FIG. 1.

FIG. 3 shows the construction of the filter element 12 is a partially unrolled state. In this embodiment, two layers of filter media are placed one on top of the other, to form a two layer composite 13, and rolled together. The first layer 34 is substantially flat filter media. The second layer 36 is preferably made of a similar filter media; however, it is preferably corrugated such that it has a plurality of side by side peaks and valleys forming flutes. Media layer 36 is preferably sinuisodially configured, but may also be corrugated to have a different configuration, such as triangular or trapezoidal shape or the like, however, the sinusoidal shape appears to maximize the filtering surface available and thus the loading capacity is thereby increased. The two layers of filter media 34 and 36 are nested together such that when they are rolled into a cylindrical shape to create a composite roll, it appears that the filter is made up of alternate layers of media which spiral inwardly toward the center. It is preferable to have layer 34 as the outermost layer of the composite roll; however, it is not essential for the operation of the invention.

Figure 13:
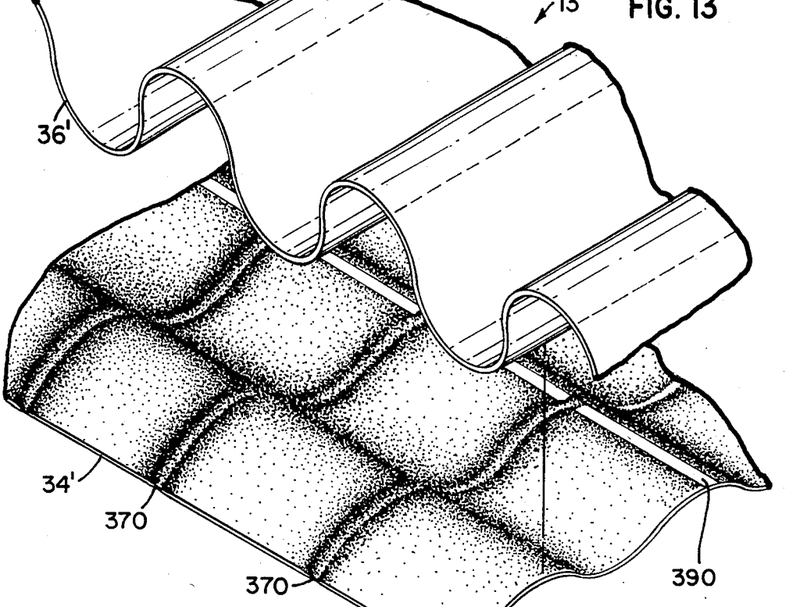
FIG. 13 is an exploded perspective view of a further type of filter element embodiment according to the present invention.
Figures 14, 15:
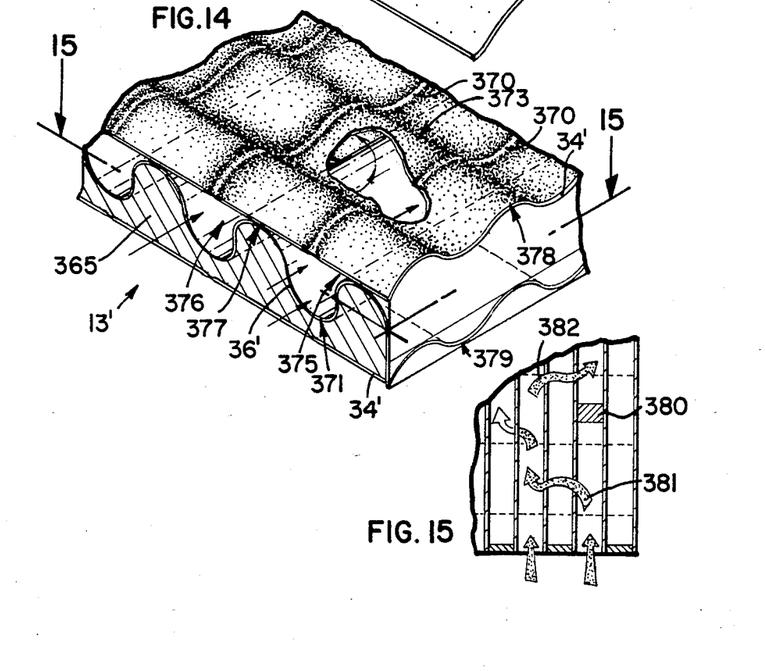
FIG. 14 is a perspective view of the filter type of FIG. 13.
FIG. 15 is a cross sectional view taken along the lines 15—15 of FIG. 14.
Figure 16:
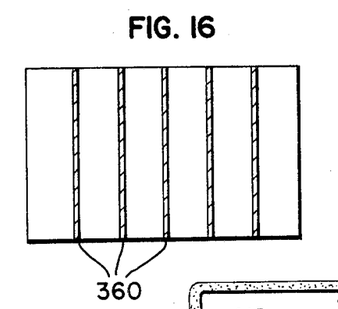
FIGS. 16 and 17 are illustrations of the contact areas between layers of different embodiments of filter composites.

Referring to FIGS. 13 and 14, an alternate to the formation of two-layer filter composite 13 of filter element 12 is illustrated (the dipling is not intended to signify media loading patterns). In this embodiment the second layer 36' is substantially identical to that illustrated in FIG. 3 but the first layer 34' is corrugated, instead of flat. Filter composite 13' has certain advantages over filter composite 13 relating to enhanced utilization of filter media area and enhanced fluid flow through the filter. The enhanced utilization of filter media may be best understood with momentary reference to FIGS. 16 and 17 which illustrate the difference between composite 13 and composite 13' with respect to the interface between the respective layers thereof. Specifically, FIG. 16 illustrates the areas of unutilized filter media for composite 13 which result from the contacting or gluing of the flat layer 34 to corrugated layer 36 along the valley portions of layer 36. Little or no filtering is effected in this contact area, illustrated as "strips" 360, due to the combined thickness of the filter media or due to glue deposits in the media in the case where adhesive is employed to hold layers 34 and 36 together along strips 360. In actuality, due to considerations of fluid flow there is additional wasted or underutilized media on either side of the actual contact area.

Figure 17:
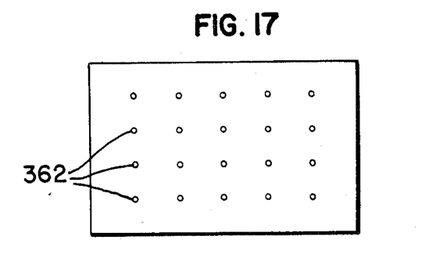

Filter composite 13', on the other hand, provides for almost complete utilization of layers 34' and 36' across the entire interface, as illustrated in FIG. 17. In the case of composite 13', the contact between layer 34' and 36' is limited to small "point" areas 362 which occur between the respective peaks and valleys of layers 34' and 36'. Thus, the wasted media problem associated with composite 13 is substantially overcome. Composite 13' accordingly provides improved flow of fluids through the filter and consequently increased loading per unit volume as compared to composite 13 and less filter media may be used to accomplish the same filtering result.

Layer 34' and 36' are optionally calendared together along the valleys of layer 36' (370) to provide axis of flex tranverse to the corrugation of layer 34', important when a rolled filter element is desired, and to aid in holding the layers together. However, this is not essential to the invention.

As is evident from the foregoing, a plurality of inter-flute passageways are thus formed between adjacent corresponding flutes of layer 36', for instance passageway 373, formed between flutes 375 and 376 in the area over peak 377 of layer 36' and under peak 378 of layer 34'. It will be understood upon inspection that similar inter-flute passageways are formd between flutes underneath layer 36', for example below valley 371 of layer 36' and above valley 379 of layer 34'. The advantage of these inter-flute passageways aside from enhanced media utilization may best be understood with reference to FIGS. 6 and 15, and will be described hereinlater. While the ensuing description of the invention is made primarily with respect to the implementation of filter composite 13, it will be understood that composite 13' may be implemented in substantially the same manner as described herein with respect to composite 13.

With reference again to FIG. 3, in the preferred construction of filter element 12, a bead of sealant such as glue 38 is laid between layer 34 (or 34') and one face 36a of layer 36 (or 36'). When the two layers are brought together, a series of hollow flutes or passages 40 are formed bounded by layer 34 and face 36a. The flutes may be tubular in shape with varied cross sections. The glue 38 acts as a sealant on the peripheral edge where it is preferably placed and causes the passage 40 to be sealed against entry or exit of fluid at this end.

A second bead of glue or sealant material 42 is placed between face 36b of layer 36 and layer 34 toward the peripheral edge of the remaining end of the filter. When the layer 34 and face 36b are brought together, a second set of tubular passage 44 are formed. Their ends are sealed by bead 42 such that fluid may not enter or exit passages 44 at this end.

The filter is completed by rolling the layers together and allowing the sealant bead to solidify. Bead 42 in FIG. 3 is shown as it would appear before the layers are brought together and do not show the spreading and filling which will occur at that time. Referring to FIG. 13 momentarily, it may be seen that in the case where corrugated media 34' is utilized in place of flat media 34 strips of adhesive 390 may be implemented here and there along media 34' in parallel to the corrugations thereof to assist in maintaining media 34' and 36' in close relationship with one another.

In the filtering process, fluid entering the filter at one end may only enter the open passage (either 40 or 44, depending on the end) and must exit flutes which are open on the other end of the filter. During this process, filtering occurs when the fluid must travel in a direction substantially orthogonal to that of its intake direction, pass through a sidewall of either corrugated media 36 or flat media 34 on its way to a passsage with an open end. It is noted that all elements of the filter media perform a filtering function, and are not merely used for structural purposes.

If it is desired to insure a solid bond between the peaks and valleys of layer 36 and layer 34, the composite roll may be made under heat and pressure so that the layers will adhere to each other at points of contact or alternatively, adhesive may be added to the peaks to insure a good bond. It is, however, not a problem that there be such a bond for filtering purposes because fluid which might leak through between the layers must still pass through a layer in order to exit the filter, the bond assist only with respect to structural aspects of the filter.

As an alternative to applying beads 38 and 42, it is possible to roll the two sheets of media into the composite roll and inject sealing material, such as hot melt glue by glue gun, into the appropriate passage ends as per above.

Figure 5:
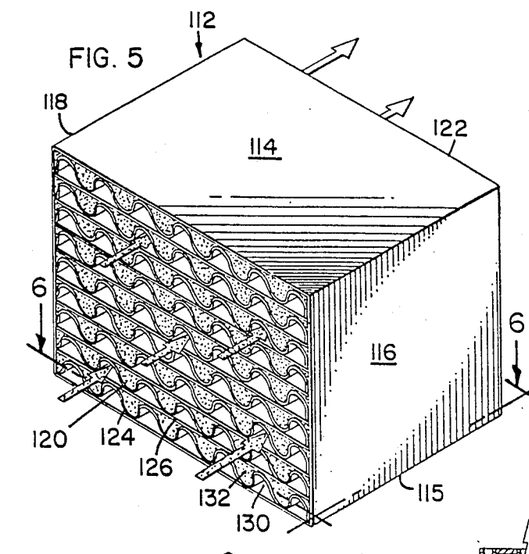
FIG. 5 is a perspective view of a second embodiment of the invention.
Figure 6:
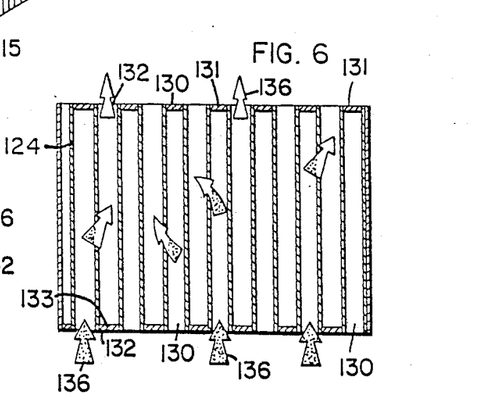
FIG. 6 is a cross sectional view taken along line 6—6 of FIG. 5.

An alternative embodiment is shown in FIGS. 5 and 6. This embodiment operates in substantially the same manner as the first embodiment. However, it is formed into a rectangular shape for convenience. In FIG. 5 there is shown a filter element 112 having a top 114, a bottom 115 (not visible) two sides 116 and 118 and a front 120 and back 122. Sides 116, 118 and the top and bottom are made of a barrier of fluid impervious material which may either be a planar members of a solid structural material such as fiberboard, plastic or metal or may alternatively be a coating of a fluid sealant material which may be applied in a liquid form and let harden. In this embodiment, layers of corrugated filter media 124 are alternated with substantially flat media 126 (or the corrugated media shown with respect to FIGS. 13 and 14) creating a sandwich-like or stacked arrangement of two-layer filter composites 13 (or 13'). The minimum requirements for such a filter are the fluid impervious walls as shown and at least one layer of corrugated filter media plus the end sealant as explained below. The sandwich of alternate layers creates two series of tubular flutes or passages, 130 and 132, one series on either side of every corrugated filter media 124. In the case where filter composite 13' is utilized, the sandwich of alternate layers also creates two series of inter-flute passageways between like-sealed horizontally adjacent flutes. Sealant means such as hot melt glue or the like is applied to passages 132 on the front end 120 for every layer of filter media. The sealant means may be applied by injection or as previously in the first embodiment by laying a bead of sealant on the filter media toward front edge 120. Passages 130 which are not blocked at front 120, are sealed in a similar manner on backside 122. FIG. 6 shows in cross section of sealant 133 which is applied to passages 132 and sealant 131 applied to passage 130 opposite faces of the filter.

One possible flow pattern (utilizing filter composite 13) is shown by arrows 136 wherein fluid enters passages 130, crosses through the corrugated media layer 124 and exits by passages 132 on the other end. Alternatively, fluid may pass upwardly or downwardly across the flat media layer 126 and exit via an adjacent passage above or below the passage of entry.

As fluids pass through a media wall, filtering occurs and particulate matter becomes lodged within the media itself. Because this loading will increase the face velocity at that point, particulate matter will tend to be collected at other points along the walls thereby evenly distributing the particulate matter throughout the filter until it is fully loaded.

FIG. 15, which is taken along the lines 15—15 of FIG. 14, illustrates the other function of the inter-flute passageways provided when filter composite 13' is implemented, in this case as an alternate for the implementation of composite 13 as shown in FIG. 5. FIG. 14 shows composite 13' as it would be employed where it used instead of composite 13 in the embodiment of FIG. 5. Every other flute is blocked by a sealant 365 as illustrated with respect to sealant 132 in FIG. 5, and the composites are stacked one on top the other so that a layer 34' lays atop a flute forming layer 36' as they are piled. It will be understood that composites 13' may be sealed on their sides as illustrated with respect to the embodiment of FIG. 5, to prevent unfiltered air from "leaking" through the element without passing through filter media.

In the case of a particulate matter obstruction in a flute, for example obstruction 360, the inter-flute passageways allow for the bypassing thereof, for example as shown by arrows 381 and 382, whereby otherwise inexcessable filter media downstream of obstruction 380 may be reached for utilization. In addition, and perhaps more importantly, the inter-flute passageways provide for redirecting fluid flow from flutes in which the filter walls are spent or clogged to other unspent flutes. Filter media waste or underutilization introduced by obstructions is thereby reduced, in proving the filters useful life and lengthening the meantime between replacements. Accordingly, savings in both filter and labor costs are acheived. It will be readily seen that the bypassing or redirecting feature of filter composite 13' is equally effective in all the embodiments described herein with respect to filter composite 13 although the greatest advantages are achieved when it is implemented in the embodiments of FIGS. 1–6.

Figure 7:
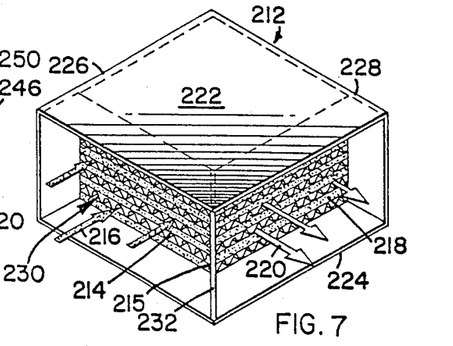
FIG. 7 is a perspective view of a right angle embodiment of the present invention.
Figure 8:
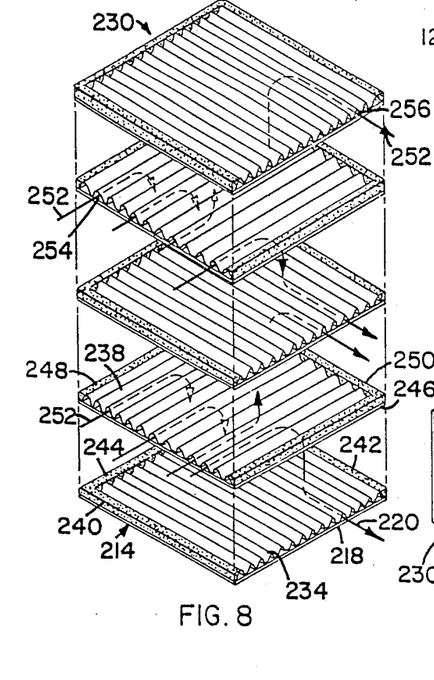
FIG. 8 is an exploded perspective view of the embodiment shown in FIG. 7.

A further embodiment of the present invention is shown in FIGS. 7 and 8 of the drawings. This embodiment provides for right angle fluid flow as shown in FIG. 7 wherein filter element 212 allows for intake of fluid at face 214 as indicated by arrows 216 and there the outflow occurs at face 218 as indicated by arrows 220. Filter element 212 preferably includes a fluid impervious top and bottom wall 222 and 224, respectively. Two adjacent sidewalls 226 and 228 are also provided.

Disposed between the aforementioned four walls is the sequence of layers of filter media formed at a filter pack 230 which are shown most clearly in an exploded view in FIG. 8. Walls 222-228 are preferably made larger than the filter pack 230 in order to form a partial housing for the filter which helps direct flow. The walls extend beyond the filter pack forming a partial housing around faces 214 and 218. A divider wall 232 is preferably disposed between top and bottom walls 222 and 224 and a corner edge 215 of filter pack 230 at preferably a 135 degree angle relative to a face of the filter pack with one edge of the divider in abutment with edge 215 defined as intersection of adjacent faces of filter pack 230. This divider serves to clearly segregate inlet and outlet flows.

Turning to FIG. 8, the preferred sequence of filter elements can be seen. Filter pack 230 includes at least one corrugated layer of filter media 234, a flat layer of filter media 236 (forming composite 13) placed atop layer 234 and a third layer of corrugated filter media 238 set atop layer 236 where the corrugations of layer 238 and 234 are substantially orthogonal to each other. While layers 236 and its corresponding layers are shown as flat, it will be understood that they may also be corrugated as shown with respect to layer 34' of the filter composite 13'. The orientation may also be less than 90 degrees and still produce the desired result, however, the fabrication becomes more difficult. The combination of flat and corrugated sheets of media create hollow passages, or flutes. Sealant means is applied to the flutes as shown in FIG. 8 as follows. Opposite edge 240 and 242 along layer 234 are coated with a fluid impervious barrier material which will prevent the entry or exit of fluids therethrough. On edge 244, the sealant material is applied to close passages on both faces of layer 234. Application of sealant may also be made in the same manner as explained for previous embodiments herein.

On layer 238, edges 246 and 248 are sealed in the same manner as edges 240 and 242. In the case where filter composite 13' is implemented, edges 246, 248 are sealed as illustrated by edge seal 392 in FIG. 14. Likewise, the passages on both sides of sheet 238 along edge 250 are sealed in the same manner as that of edge 244. This sealing sequence is repeated for however many layers are desired such as that shown in FIG. 8. Flat layer 236 (or the corrugated layer of composite 13') may or may not be sealed when the appropriate edges of the corrugated layers 234 and 238 are sealed. It is likely that layer 236 will be sealed at its peripheral edge along with its adjacent corrugated layers for purely practical reasons of size, however, since fluid will not as a practical matter pass through the filter via this edge, there is no necessity for sealant.

The flow produced is shown by arrows 252 wherein fluid enters passage 254, for example, is blocked by the sealant on end 250 thereof and must exit by passing through a layer 236 which resides between two layers of corrugated filter media. The fluid 252 may then exit by a passage 256 which is oriented orthogonally to that of passage 254. Thus, the intake and outlet flows are at right angles without the need for additional housing apparatus to achieve this flow redirection.

Figure 9:
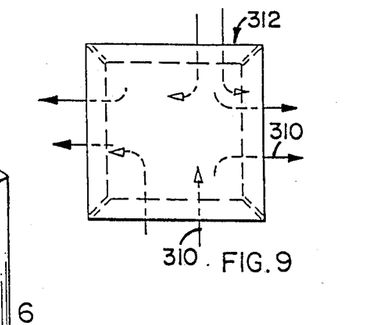
FIG. 9 is a plan view of an embodiment shown in FIG. 10.
Figure 10:
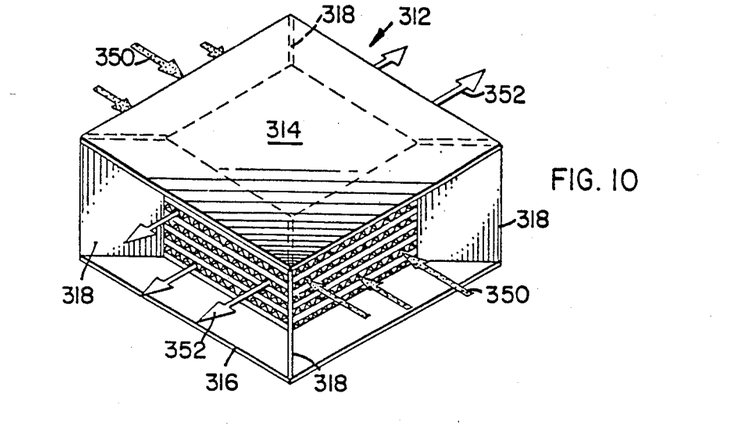
FIG. 10 is a perspective view of a cross-flow embodiment of the present invention.
Figures 11, 12:
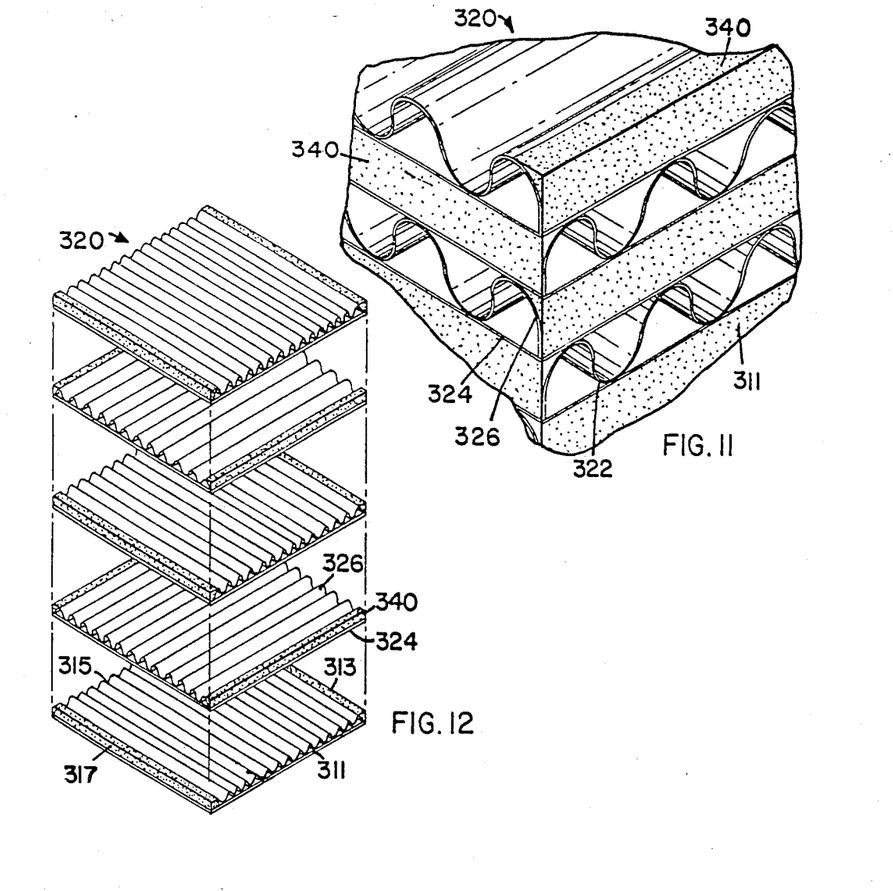
FIG. 11 is an enlarged fragmentary perspective of the embodiment shown in FIG. 10.
FIG. 12 is an exploded perspective view of the embodiment in FIG. 10.

FIGS. 9, 10 and 11 disclose a cross flow embodiment of this invention. FIG. 9 shows in schematic form by means of arrows 310 the fluid flow within filter element 312. In this embodiment, fluid may enter by two opposing side walls and exits orthogonally in either direction as filter fluid through the remaining sidewalls.

FIG. 10 shows the location of the layers of filter media relative to the top and bottom fluid barriers 314 and 316, respectively. It is preferable to make the top and bottom barriers larger than the filter pack so as to provide means for directing the airflow within the filter. Four divider walls 318 are interposed between top and bottom barriers 314 and 316 at a 135 degree angle and in abutment with each corner of the filter pack in a manner similar to that of wall 232 in FIG. 7, except that here the divider walls are employed on all four edges of the pack as shown in the figure. These walls eliminate the need for a separate housing for separating fluid intake and outlet.

The arrangement of layers of filter media in this embodiment is similar to that as shown in the previous embodiment in FIGS. 7 and 8, except for the points which will be explained below.

FIG. 11 shows an enlarged fragmentary perspective of this filter pack 320 and in exploded perspective in FIG. 12. The filter pack 320 preferably rectangular with four sides 311, 313, 315 and 317, none of which are entirely sealed off from entry or exit of fluids.

As in the previous embodiment, there is a first layer of corrugated filter media 322, a second layer of substantially flat media 324 and a third layer of corrugated media 326 with its corrugations aligned orthogonally to that of layer 322. Of course, the corrugated layer shown with respect to FIGS. 13 and 14 may be substituted for flat layer 324, hereby, for example, composite 13' would be substituted layers 324 and 326, and corresponding layers.

Edges and passages of the filter pack are sealed as follows. On sidewall 311, corrugated media layer 322 has its flutes or tubular passages left unsealed. Layer 326 (and optionally 324) are coated or injected with sealant material 340 on edge 311 so as to prevent entry or exit through these exposed sides of the passages. See FIG. 11 for detail. The sequence of sealing on edge 311 is repeated for however many layers there are. On side 315 opposite 311 precisely the same pattern of sealant is applied so that passages formed by the layers 322 and 324 will be open to both sides 311 and 315.

On side 317, layer 322 is sealed along its edge as shown so that fluid may not enter or exit through this portion of the layer and optionally along the adjoining flat layer 324. Corrugated media layer 326 is unsealed on this end with respect to the passages which are formed by layers 326 and 324.

On side 313, precisely the same arrangements for sealing is employed as was used on side 317 so that flutes on either side of layer 326 are open on both ends. This sequence of sealing is repeated for however many layers of filter media are in this pack.

When a filter pack 320 is assembled it will appear as shown in FIG. 11 in the enlarged fragmentary view.

Figure 18:
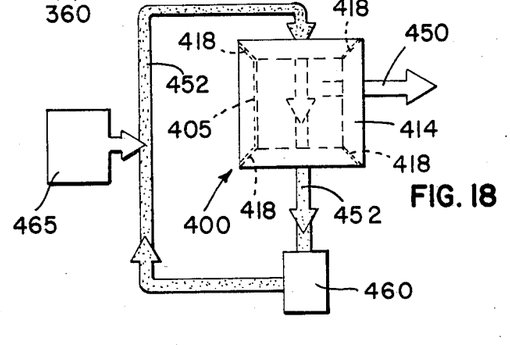
FIG. 18 is a diagrammatic illustration of the filter element of FIG. 19 as preferably employed.
Figure 19:
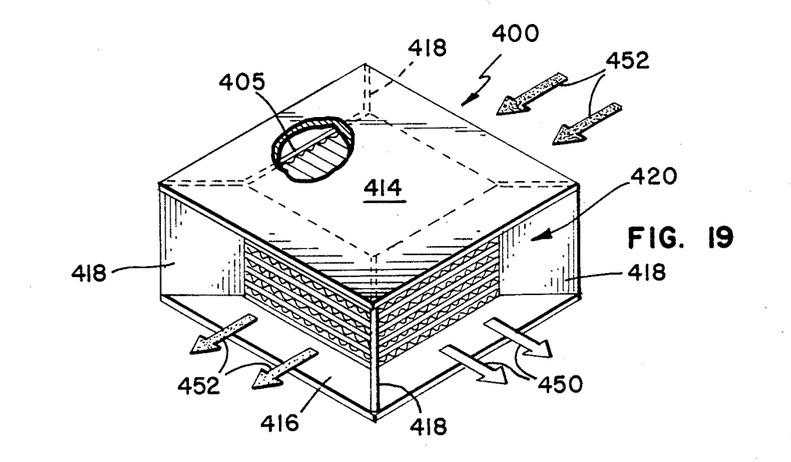
FIG. 19 is a perspective view of a further type of filter element embodiment according to the present invention.

One possible flow pattern for this filter is shown in FIG. 10 wherein arrows 350 indicate the entry of fluids from two sides while arrows 352 illustrate the exit of the fluids from the remaining two sides orthogonal to arrow 350. Although this flow pattern is suggested, it is understood that alternative flow patterns are possible depending on the application of the filter. Another embodiment of the present invention is illustrated in FIGS. 18 and 19. Filter 400 is similar to filter 312 insofar as it includes barriers 414 and 416, and filter pack 420, walls 418 but differs in that it includes an additional barrier 405, thereby forming a three port housing. Preferably, filter 400 is used by circulating fluid 452 (to be filtered) straight through from one sidewall to an opposing sidewall and by sucking or evacuating cleaned or filtered air 450 out the remaining sidewall. If the flow of filtered fluid 450 out of the filter 400 is maintained at a rate below that of fluid 452 entering the filter, a self-cleaning effect is accomplished, as the balance of uncleaned fluid exiting the filter tends to carry contaminant deposits away from the surface of the filter media. This effect can be enhanced utilizing gravity, as illustrated in FIG. 18. Filter 400 is mounted so that contaminated fluid 452 flows from top to bottom so that the force of gravity tends to pull contaminants down and out of the filter pack 420, for collection in a concentrator 460. Unfiltered fluid exiting the concentrator 460 is recirculated with fresh or newly introduced fluid from a source 465, such as a tank of fluid. Implementation of the system of FIG. 18 is particularly effective where liquids are sought to be filtered, such as the filtering of water out of diesel fuel. It will be understood of course that either filter composite 13 or 13' may be utilized to form filter pack 420. Numerous characteristics and advantages of the invention have and advantages of the been set forth in the foregoing description together with the details of the structure and function of the invention. Novel features thereof are pointed out in the appended claims. The disclosure, however, is illustrative only, and changes may be made in detail especially in matters of size, shape, arrangement of parts, within the principle of the invention to the full extent intended by the broad general meaning of the terms in which the appended claims are expressed.

I claim:

1. A composite filter media for use in a fluid filter for removing particulate matter comprising:
   a first sheet of corrugated filter media;
   a second sheet of corrugated filter media;
   said sheets being nested with each other to create a layered composite so that alternate sheets of corrugated media are in contact with each other over their surfaces with their respective axis of corrugation at substantially right angles with opposing surfaces of said sheets defining a first plurality of parallel longitudinal flutes with adjacent flutes separated by said first sheet and with opposing surfaces of said sheets defining a second plurality of parallel longitudinal flutes transverse to said first plurality of flutes with adjacent flutes in said second plurality separated by said second sheet; said second plurality of flutes connecting every other one of said flutes of said first plurality in fluid flow communication;
   sealant means applied to said one end of said composite to block every other one of said longitudinal flutes of said first plurality;
   sealant means applied to said opposite end of said composite to block the ends of said longitudinal flutes of said first plurality which are open on said one end of said composite whereby fluid may be filtered by passing through adjacent flutes; and
   means for blocking fluid flow out of said second plurality of flutes.

2. A fluid filter for removing particulate matter comprising:
   a first roll of corrugated filter media having generally parallel corrugations;
   (b) a second roll of corrugated filter media having generally parallel corrugations;
   said rolls being nested with each other to create a composite roll with corrugations of adjacent filter media being generally transverse to one another with opposing surfaces of said media defining a plurality of longitudinal hollow passages extending through said composite roll from one end thereof to the other and a plurality of transverse passageways transverse to said longitudinal hollow passages, said longitudinal hollow passages being formed in two spiral series, one surface of said longitudinally corrugated media being part of one series and the remaining surface being part of said other series of passages;
   (c) sealant means applied to one of said spiral series of passages on one end of said composite roll for blocking fluid entry and egress from said series at that end; and, (d) sealant means applied to the other of said spiral series of flutes on the other end of said composite roll for blocking entry and egress of fluid from said series at said other end.

3. The filter of claim 2 including fluid impervious barrier covering said composite roll along its exterior surfaces which are parallel said longitudinal axis so that fluids may only enter and exit said filter at its ends.

4. The filter of claim 3 wherein said barrier is a cylindrical shell sized to receive said filter and be in contact with the exterior surface thereof.

5. The filter of claim 3 wherein said barrier is a fluid sealant applied to the exterior surface of said composite roll.

6. A cylindrical fluid filter for removing particulate matter comprising:
(a) a composite roll having first and second ends and a longitudinal axis, said roll including a first sheet of transversely corrugated filter media and a second sheet of filter media formed into a substantially sinuous configuration having a series of longitudinal peaks and valleys extending parallel with said longitudinal axis, said first and second sheets being in contact with each other and formed into an inwardly spiraling composite roll of alternate layers of sheets with opposing surfaces of adjacent filter media defining a layer of a plurality of hollow passages with adjacent layers of passages being orthogonally oriented; a plurality of interpassage passageways connecting adjacent passages in a same layer in gas flow communication; and
(b) sealant means for blocking fluid flow applied to one of said series of passages at said first end and the other of said series of passages at said second end so that fluid entering said one series of passsage at their remaining unsealed end must pass through filter media and exit through the remaining unsealed end of said other series, thereby causing particulate matter to be lodged in the filter media.

7. The filter of claim 6 wherein said corrugated medias are bonded to each other at points of contact.

8. The filter of claim 6 wherein said sealant means includes a bead of sealant deposited between said layers proximate the ends of the filter.

9. The filter of claim 6 wherein the sealant means includes plugs inserted within said passages at their ends.

10. A fluid filter having four sides comprising:
(a) a pair of fluid impervious members in a spaced relationship forming a top and bottom barrier;
(b) a filter element to be bounded on its upper and lower faces to said barrier elements, said element including a filter pack having:
a first layer of corrugated filter media having a surface of longitudinal peaks and valleys, a second layer of corrugated filter media atop said first layer, said second layer being of corrugated filter media having a surface of longitudinal peaks and valleys which are oriented orthogonally to the corrugations in said first layer, a third layer of corrugated filter media having a surface of longitudinally peaks and valleys which are oriented parallel to the longitudinal peaks and valleys of said first layer, opposing surfaces of adjacent filter media defining a layer of a plurality of hollow passages with adjacent layers of passages being orthogonally oriented;

sealant means for preventing entry or exit or fluid therethrough, applied to said first and second layers of media on peripheral edges thereof which are parallel to the axis defined by the longitudinal corrugations of said first layer, sealant means for preventing the entry or exit of fluid therethrough applied to said third layer on the peripheral edges thereof which are parallel to the axis defined by the longitudinal corrugations of said third layer.

11. The filter according to claim 10 wherein said filter pack has four sidewalls and including barrier means for blocking passage of fluids applied to two adjacent sidewalls of said fluid pack so that only two remaining sides will allow passage of fluids into and out of said filter.

12. The filter according to claim 11 wherein said barrier means includes a fluid impervious coating.

13. The filter of claim 11 wherein said barrier means includes planar members affixed to said two adjacent sidewalls.

14. The filter of claim 13 wherein said fluid impervious members extend beyond said filter pack, and including at least one divider member having one edge in abutment with the intersection of adjacent sidewalls, said divider members being between and in contact with said fluid impervious members, thereby dividing inlet and outlet sides of said filter.

15. The filter of claim 14 wherein said divider wall is oriented at about 135 degrees relative to each of said adjacent sides in which it is in abutment.

16. The filter of claim 10 wherein said sealant means includes a fluid impervious coating which is applied to said filter element.

17. A fluid filter comprising:
(a) top and bottom walls, two sides, and a front and back; said top and bottom walls and two sides being fluid impervious,
(b) a filter pack disposed between said two sides, and top and bottom walls, said pack including;
(1) a first corrugated layer of filter media having one surface thereof in contact with said top, said corrugations running parallel to said two sides of the filter,
(2) a second corrugated layer of filter media having one surface thereof in contact with said first layer, said corrugations of said second layer running transverse to said two sides of the filter,
(3) a third corrugated layer of filter media with one surface thereof in contact with said bottom; said corrugations of said third layer running in parallel with the corrugations of said first layer,
(4) a fourth corrugated layer of filter media having one surface thereof in contact with said third layer, said corrugations of said fourth layer running in parallel with the corrugations of said second layer,
an intermediate element of filter media disposed between and in contact with the remaining surfaces of said second and fourth layers,
opposing surfaces of said first, second, third, fourth and intermediate layers together defining a plurality of layers of hollow passages having ends opening at said front and back sides with passages of adjacent layers being generally orthogonal,
(c) sealant means for preventing entry or exit of fluid applied to every other of said openings of said first and third layers on said front side thereby closing one end of every other passage and applied to openings on the back side of passages which are open on the front side, thereby closing every passage at one of its two ends, whereby fluids entering unsealed openings of passage in one end of the filter must exit said filter via different passages on the other end and thereby pass through filter media.

18. A filter according to claim 17 wherein said intermediate element includes a sandwich of alternating intermediate layers of oppositely oriented corrugated filter media, said sandwich corrugated parallel to said two sides of the filter as to top and bottom layers of the intermediate element and wherein every other of said layers include corrugations which are oriented transverse to the corrugations of said first layer.

19. A filter according to claim 17 wherein said two sides and top and bottom include a coating of fluid impervious material.

20. A filter according to claim 17 wherein said two sides, and top and bottom are covered by planar members.

21. The filter according to claim 17 wherein said corrugations are generally sinuous in configuration.

22. A fluid filter compising:

a plurality of alternating layers of a first and a second sheets of filter media set one atop the other, said first media layer being corrugated to form a series of side by side peaks and valleys extending longitudinally across the face of the media, said second media layer being corrugated with side by side peaks and valleys oriented transverse to said first layer opposing surfaces of said layers defining a first series of flutes between the valleys of each of said first layer and said second layer and a second series of flutes between the peaks of each of said first layer and second layer of media directly adjacent thereto and forming a first series of transverse passageways between adjacent ones of said flutes in said first series and a second series of transverse passageways between adjacent ones of said flutes in said second series; interflute passageways extending between alternating flutes in a series; and sealing means for blocking entry and egress of fluid applied to the ends of said first series of flutes at one end of thereof and applied to said second series of flutes at the other end thereof, so that fluids entering one of said series of flutes at their open end must pass through filter media before leaving the filter.

23. The filter of claim 22 including wall means applied to the outer surfaces of the filter which are parallel with said longitudinal flutes for preventing entry and exit of fluids from those surfaces.

24. A fluid filter having four sides comprising:
(a) a pair of fluid impervious members in a spaced relationship forming a top and bottom barrier and a third fluid impervious member extending between said top and bottom barriers to form a sidewall;
(b) a filter element to be bounded on its upper and lower faces and one side face to said barrier elements, said element including a filter pack having:

a first layer of corrugated filter media having a surface of longitudinal peaks and valleys, a second layer of corrugated filter media atop said first layer, said second layer being of corrugated filter media having a surface of longitudinal peaks and valleys which are oriented orthogonally to the corrugations in said first layer, a third layer of corrugated filter media having a surface of longitudinal peaks and valleys which are oriented parallel to the longitudinal peaks and valleys of said first layer with opposing surfaces of said filter media defining a layer of a plurality of fluid passageways between each of said layers of filter media with passages of adjacent layers aligned generally orthogonal;

sealant means for preventing entry or exit or fluid therethrough applied to said first and second layers of media on peripheral edges thereof which are parallel to the axis defined by the longitudinal corrugations of said first layer, sealant means for preventing the entry or exit of fluid therethrough applied to said second layer on the peripheral edges thereof which are parallel to the axis defined by the longitudinal corrugations of said third layer.

25. The filter of claim 24 wherein said fluid impervious members extend beyond said filter pack, and including at least one divider member having one edge in abutment with the intersection of adjacent sidewalls, said divider members being between and in contact with said fluid impervious members, thereby dividing inlet and outlet sides of said filter.

26. The filter of claim 25 wherein said divider wall is oriented at about 135 degrees relative to each of said adjacent sides in which it is in abutment.

* * * * *

UNITED STATES PATENT AND TRADEMARK OFFICE
CERTIFICATE OF CORRECTION

PATENT NO. : 4,589,983

DATED : May 20, 1986

INVENTOR(S) : Robert M. Wydevan

It is certified that error appears in the above-identified patent and that said Letters Patent is hereby corrected as shown below:

At column 1, line 5, for ""Fluid Filtering Device," read --"Fluid Filtering Device"--;

At Column 2, line 32, for "side of" read --side on--;

At column 3, line 6, for "Fig. 1." read --Fig. 1;--;

At column 5, line 33, for "primarly" read --primarily--;

At column 7, line 23, for "360" read --380--;

At column 7, line 35, for "acheived" read --achieved--;

At column 8, lines 34-35, for "mattter" read --matter--;

UNITED STATES PATENT AND TRADEMARK OFFICE
CERTIFICATE OF CORRECTION

PATENT NO. : 4,589,983

DATED : May 20, 1986

INVENTOR(S) : Robert M. Wydevan

It is certified that error appears in the above-identified patent and that said Letters Patent is hereby corrected as shown below:

At column 10, line 5, for "have and advantages of the been" read --have been--;

At column 10, line 48, for "a first" read --(a) a first--;

At column 13, line 34, for "layer" read --layer;--;

At column 13, line 48, for "end of thereof" read --end thereof--.

Signed and Sealed this

Twenty-first Day of October, 1986

[SEAL]

Attest:

DONALD J. QUIGG

Attesting Officer

Commissioner of Patents and Trademarks